United States Patent [19]

Inoue et al.

[11] Patent Number: 4,878,453

[45] Date of Patent: Nov. 7, 1989

[54] INDICATING INSTRUMENT FOR AUTOMOTIVE VEHICLE

[75] Inventors: Tai Inoue; Masaya Sugita, both of Susono; Keiji Okamoto, Shimada, all of Japan

[73] Assignee: Yazaki Corporation, Japan

[21] Appl. No.: 168,398

[22] Filed: Mar. 15, 1988

[30] Foreign Application Priority Data

Mar. 16, 1987 [JP] Japan .................. 62-037182[U]
Nov. 28, 1987 [JP] Japan .................. 62-174994[U]

[51] Int. Cl.$^4$ .................................... G01D 13/04
[52] U.S. Cl. ........................ 116/288; 116/284; 116/291; 116/294; 116/328; 116/DIG. 6; 116/DIG. 36
[58] Field of Search .................. 116/286–288, 116/328, 332, 334, 330, 331, DIG. 6, DIG. 36, 204, 284, 291, 294, 295, 297, 327, 329; 362/23, 26, 29, 30; 324/146; 340/691, 60.1

[56] References Cited

U.S. PATENT DOCUMENTS

| | | | |
|---|---|---|---|
| 1,723,390 | 8/1929 | Tingley | 116/316 |
| 2,668,945 | 2/1954 | Pfeffer | 324/146 |
| 2,793,605 | 5/1957 | Helgeby | 116/284 |
| 2,945,313 | 7/1960 | Hardesty | 116/DIG. 36 |
| 3,094,659 | 6/1963 | Pfeffer | 324/146 |
| 3,110,882 | 11/1963 | Steurzl et al. | 340/52 R |
| 3,257,748 | 6/1966 | Hardesty | 116/286 |
| 3,499,417 | 3/1970 | Heinke | 116/62.1 |
| 3,511,211 | 5/1970 | Horne et al. | 116/286 |
| 3,568,630 | 3/1971 | Blackwell | 116/129 |
| 3,590,233 | 6/1971 | Protzmann et al. | 240/2.1 |
| 4,004,546 | 1/1977 | Harland | 116/288 |
| 4,090,131 | 5/1978 | Mas | 324/146 |
| 4,163,428 | 8/1979 | Ishikawa | 166/288 |
| 4,180,847 | 12/1979 | Cresko et al. | 362/29 |
| 4,233,927 | 11/1980 | Oikawa et al. | 116/287 |
| 4,252,078 | 2/1981 | Fukasawa et al. | 116/DIG. 6 |
| 4,300,470 | 11/1981 | Furukawa | 116/228 |
| 4,335,351 | 6/1982 | Faria | 324/146 |
| 4,380,043 | 4/1983 | Takamatsu et al. | 362/26 |
| 4,431,966 | 2/1984 | Pucciarello | 324/114 |
| 4,492,920 | 1/1985 | Reenstra | 324/146 |
| 4,559,582 | 12/1985 | Scardilli et al. | 362/23 |
| 4,625,262 | 11/1986 | Sakakibara et al. | 362/26 |
| 4,646,007 | 2/1987 | Faria et al. | 116/297 |
| 4,724,601 | 2/1988 | MacManus et al. | 324/146 |
| 4,758,784 | 7/1988 | Baker et al. | 324/146 |

FOREIGN PATENT DOCUMENTS

| | | |
|---|---|---|
| 0133446 | 4/1984 | European Pat. Off. . |
| 1118878 | 12/1961 | Fed. Rep. of Germany . |
| 3201571 | 7/1983 | Fed. Rep. of Germany . |
| 3218010 | 11/1983 | Fed. Rep. of Germany . |
| 3437164 | 4/1986 | Fed. Rep. of Germany . |
| 1326538 | 3/1962 | France . |

Primary Examiner—William A. Cuchlinski, Jr.
Assistant Examiner—Jeffrey J. Hohenshell
Attorney, Agent, or Firm—Wigman & Cohen

[57] ABSTRACT

To unvisualize the mechanical indicating instrument for an automotive vehicle when the ignition switch is turned off, the pointer is covered by a pointer cover below zero indication when the meter is deactivated, or a semitransparent front cover is disposed in front of the dial. In this case, the meter is offset by an offset magnet from a zero position to under the pointer cover when deactivated. On the other hand, to visualize the same instrument, when the ignition switch is turned on, lamps disposed in front and/or back of the dial are illuminated and a colored transparent pointer is illuminated by another or the same lamp in linkage with the ignition switch.

7 Claims, 6 Drawing Sheets

INDICATING INSTRUMENT FOR AUTOMOTIVE VEHICLE

BACKGROUND OF THE INVENTION

1. Field of the Invention

The present invention relates generally to an indicating instrument for an automotive vehicle and more specifically to a mechanical indicating instrument mounted on an automotive vehicle, which is visible when the ignition switch is turned on but nonvisible when the ignition switch is turned off.

2. Description of the Prior Art

The indicating instruments for an automotive vehicle can be classified into two, mechanical and electrical types. In the mechanical indicating instruments, measured values are indicated by pointers. On the other hand, in the electrical indicating instruments, measured values are indicated by electric elements such as fluorescent character display tubes, light emitting diodes, liquid crystal displays, etc. alone or in combination.

In the case of the mechanical indicating instruments, the pointers and the dial are illuminated by external sunlight in the daytime and by a lamp or lamps disposed in back of the dial in the nighttime. On the other hand, in the case of the electronic indicating instruments of fluorescent character display tubes or light emitting diodes, these elements can emit light from the display surfaces thereof in the form of pattern irrespective of the daytime or nighttime.

Therefore, when the instruments are irradiated with external light, the mechanical instruments are well visible, but the instruments using display tubes or light emitting diodes are not well visible. Further, in the mechanical instruments, the pointers and dial can been seen whenever the passenger compartment is bright, even after the ignition switch has been turned off. On the other hand, in the light emitting instruments, since a dark material is placed in front of the display elements to unvisualize the light-nonemitting elements such as display tubes, resin casings, etc., when the ignition switch is off, the instrument face is black and therefore the driver cannot recognize the indicating instrument. However, when the ignition switch is turned on, only the indicator characters and/or symbols are instantaneously relieved against the dark background.

In summary, it is preferable that the indicating instruments for an automotive vehicle are dark and unvisible when the ignition switch is kept turned off, but clearly relieve quantities to be measured against the dark background.

The arrangement of the prior-art mechanical indicating instrument for an automotive vehicle will be described in further detail with reference to the attached drawings under DETAILED DESCRIPTION OF THE PREFERRED EMBODIMENTS.

SUMMARY OF THE INVENTION

With these problems in mind, therefore, it is the primary object of the present invention to provide a mechanical indicating instrument for an automotive vehicle which is dark and unvisible when the ignition switch is turned off but can clearly relieve the pointers and the dial when the ignition switch is turned on.

To achieve the above-mentioned object, an indicating instrument for an automotive vehicle, according to the present invention comprises: (a) dial means for displaying pointer scale marks; (b) pointer means for indicating a quantity measured on said dial means; (c) meter means for driving said pointer means according to a quantity measured; and (d) means, disposed on said dial means, for covering said pointer means when said meter means is deactivated.

The meter means comprises: (a) a disk-shaped rotary permanent magnet magnetized radially and provided with said pointer at its center thereof; (b) a first fixed coil wound around said permanent magnet in a radial direction thereof; (c) a second fixed coil wound around said permanent magnet extending across said first coil in another radial direction thereof; (d) an offset permanent magent disposed near said rotary permanent magnet to magnetically lock said rotary permanent magnet at a position where said pointer is covered by said pointer covering means when said meter means is deactivated.

Further, it is preferable to dispose a colored transparent front layer in front of the dial means. In this case, at least one dial illuminating lamp is disposed in back of the dial means, and at least one pointer illuminating lamp is disposed in front of the dial means.

BRIEF DESCRIPTION OF THE DRAWINGS

The features and advantages of the indicating instruments for an automotive vehicle according to the present invention will be more clearly appreciated from the following description of the preferred embodiments of the invention taken in conjunction with the accompanying drawings in which like reference numerals designate the same or similar elements or sections throughout the figures thereof and in which.

DETAILED DESCRIPTION OF THE PREFERRED EMBODIMENTS

To facilitate understanding of the present invention, a brief reference will be made to a prior-art indicating instrument for an automotive vehicle, with reference to attached drawings.

Figure 1A:
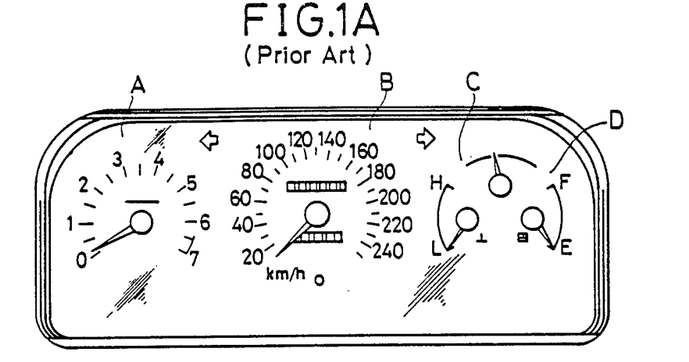
FIG. 1A is a front view showing an example of prior-art mechanical indicating instrument for the automotive vehicle.
Figure 1B:
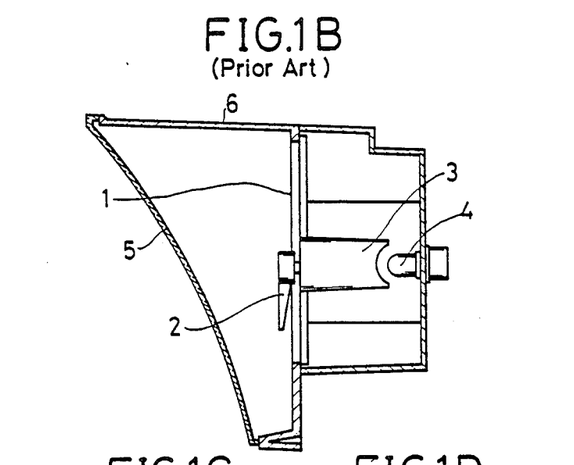
FIG. 1B is a diagrammatical cross-sectional view of FIG. 1A.
Figures 1C, 1D:
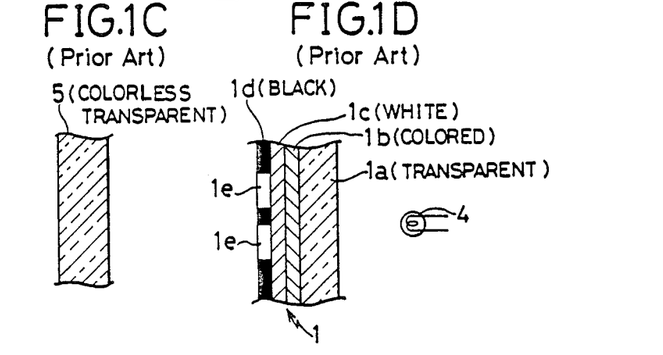
FIG. 1C is a partial enlarged cross-sectional view of the front cover of the instrument shown in FIG. 1B.
FIG. 1D is a partial enlarged cross-sectional view of the dial of the instrument shown in FIG. 1B.

FIGS. 1A, 1B and 1C show a prior-art mechanical indicating instrument. This instrument includes a engine speed mater A, a vehicle speed meter B, a coolant temperature meter C, a fuel meter D, etc., as shown in FIG. 1A. As depicted in FIG. 1B, this mechanical indicating instrument comprises a dial 1, pointers 2 disposed in front of the dial 1, cylindrical light guide plates 3 disposed in back of the dial 1, dial illuminating lamps 4 each for illuminating both the dial 1 and the pointer 2 along the light guide plate 3. Further, the instrument is housed within an instrument housing 6 covered by a front cover 5.

This front cover 5 is made of a colorless, transparent synthetic resin as shown in FIG. 1C, and the dial 1 is formed by a multilayer including a transparent material 1a, a colored layer 1b, a white layer 1C and a black opaque layer 1d in which scale marks 1e such as characters, numerals, etc. are engraved, all layers being arranged from the inside of the intrument.

In the prior-art mechanical indicating instrument, the pointers and the dial are visible whenever illuminated by external light, even after the ignition switch has been turned off.

In view of the above description, reference is now made to the first embodiment of the indicating instrument for an automotive vehicle according to the present invention.

Figure 2A:
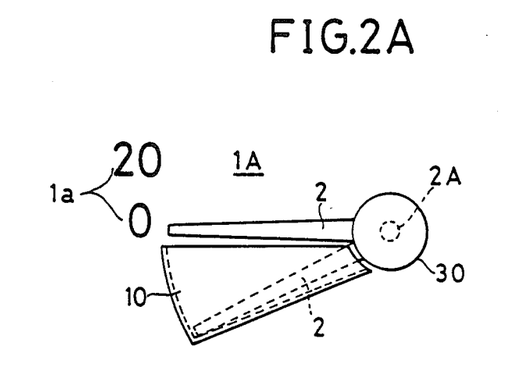
FIG. 2A is an enlarged top view showing a pointer and a pointer cover of an indicating instrument for an automotive vehicle according to the present invention.
Figure 2B:
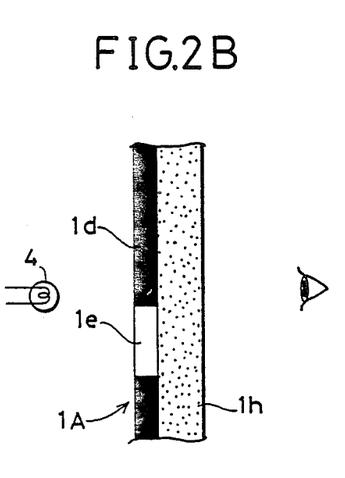
FIG. 2B is a partial enlarged cross-sectional view of the dial of the indicating instrument shown in FIG. 2A.
Figure 2C:
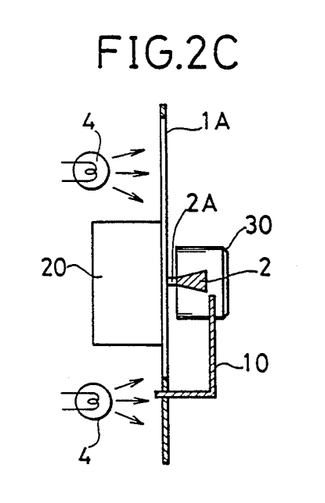
FIG. 2C is a cross-sectional view of the indicating instrument shown in FIG. 2A.

FIGS. 2A, 2B, and 2C show a first embodiment of the indicating instrument. The feature of this embodiment is to cover a pointer by pointer cover whenever the ignition switch is turned off, in order to unvisualize the pointer of the mechanical indicating instrument.

In FIG. 2A, a pointer 2 fixed to a pointer shaft 2A and covered by a pointer cap 30 is disposed on a dial 1A on which numerals (0, 20, ...) 1a are formed. The numeral 10 denotes a pointer cover for covering the pointer 2 when the pointer 2 indicates an indication below zero or the meter is deactivated.

As shown in FIG. 2B the dial 1A is composed of a black matted opaque layer 1d in which scale marks 1e such as characters, numerals, etc. are engraved and a white light transmissible paint is applied thereto, and a semitransparent layer 1h (e.g. clear lacquer painted).

Further, as shown in FIG. 2C, an internal meter 20 of cross-sectional movement type and two rear lamps 4 are arranged in back of the dial 1A. These lamps 4 are lighted up whenever the ignition switch is turned on.

Figure 3A:
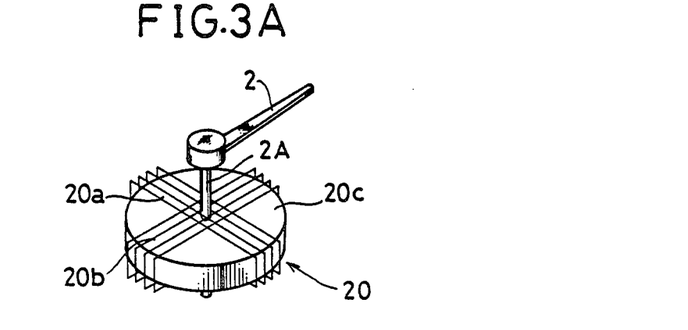
FIG. 3A is a perspective view showing a meter and a pointer incorporated in the indicating instrument shown in FIG. 2A.

FIG. 3A shows the cross-sectional movement type meter 20 including a first coil 20a and a second coil 20b, and a rotary permanent magnet 20c driven by a resultant magnetic field generated by the two coils 20a and 20b. The pointer shaft 2A is fixed at the center of the permanent magnet 20c in such a way that the longitudinal direction of the pointer 2 matches the magnetic pole arrangement direction (connecting between the two north and south poles N and S). Further, the meter 20 is provided with a pointer offset permanent magnet 20d (shown in FIG. 3B) so disposed as to drive the rotary magnet 20c to a position beyond the zero point by an attractive force generated between the two magnets 20c and 20d.

Figure 3B:
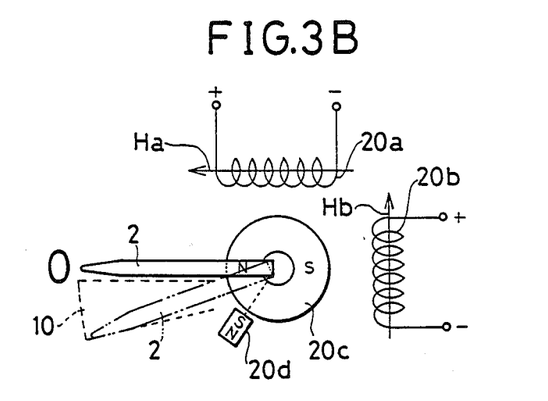
FIG. 3B is an illustration for assistance in explaining an offset operation of the meter shown in FIG. 3A.

In the above-mentioned meter, when the ignition switch is turned off, since no current flows through the two coils 20a and 20b of the meter 20, the rotary magnet 20c is rotated by an attractive force generated between the N pole of the rotary magnet 20c and the S pole of the fixed offset magnet 20d, so that the pointer 2 is brought into contact with an inner wall surface of the pointer cover 10 and therefore disappears under the pointer cover 10, as shown by dot-dot-dashed lines in FIG. 3B.

Figure 3C:
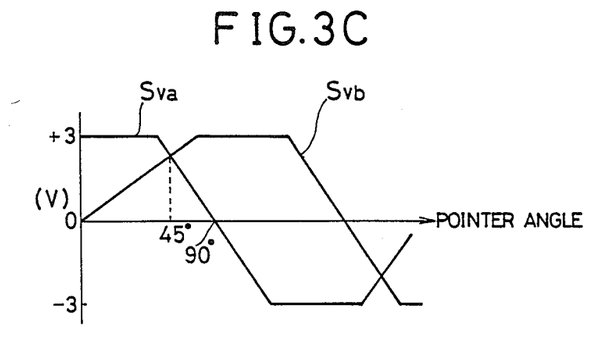
FIG. 3C is a graphical representation showing two voltage signals applied to two coils of the meter shown in FIG. 3A.

Under these conditions, when the ignition switch is turned on, a supply voltage $S_{va}$ (e.g. +3 V) is applied to a first coil 20a as shown in FIG. 3c, so that a magnetomotive force $H_a$ is generated to drive the pointer 2 to a zero position (0° in pointer angle), as shown by solid lines in FIG. 3B. Therefore, the pointer 2 appears from under the pointer cover 10 and indicates its zero position.

Thereafter, when a measured value increases, the first coil 20a is energized by a voltage $S_{va}$ which decreases as shown in FIG. 3c; on the other hand, the second coil 20b is energized by a voltage $S_{vb}$ which increases as shown in FIG. 3c. As depicted in FIG. 3c, since the two voltages increases or decreases in directions opposite to each other, the resultant magnetomotive force grates a rotary magnetic field, so that the permanent magnet 20c is rotated, until the N-S pole direction matches the magnetic field generated by the two coils 20a and 20b, to indicate a measured value on the dial. For instance, when the two the magnetomotive forces $H_a$ and $H_b$ are equal to each other, the pointer 2 is rotated at 45° pointer angle. When the magnetomotive force $H_a$ is zero and the magnetomotive force $H_b$ is the maximum, the pointer 2 is rotated at 90° pointer angle.

When the ignition switch is turned off and therefore the lamps 4 are turned off (in FIG. 2c), since no light is transmitted through the characters or scale marks formed in the dial 1A and further the pointer 2 is positioned under the pointer cover 10, the driver cannot see the needle and the dial of the indicating instrument through the semitransparent layer 1h of the dial 1A.

On the other hand, when the ignition switch is turned on, since the lamps 4 are lighted up, light emitted from the lamps 4 comes through the characters or scale marks, the driver can well see the dial. Further, since the pointer 2 is driven from under the pointer cover 10 and illuminated by another lamp as described later with reference to FIGS. 5A and 5B, the driver can well see the pointer 2.

Further, although the lamps 4 are always lighted up whenever the ignition switch is turned on, it is preferable to reduce the quantity of light emitted from the lamps 4 manually or automatically according to the brightness within the passenger compartment (the luminance of the lamp is preferably reduced at night).

Figure 4A:
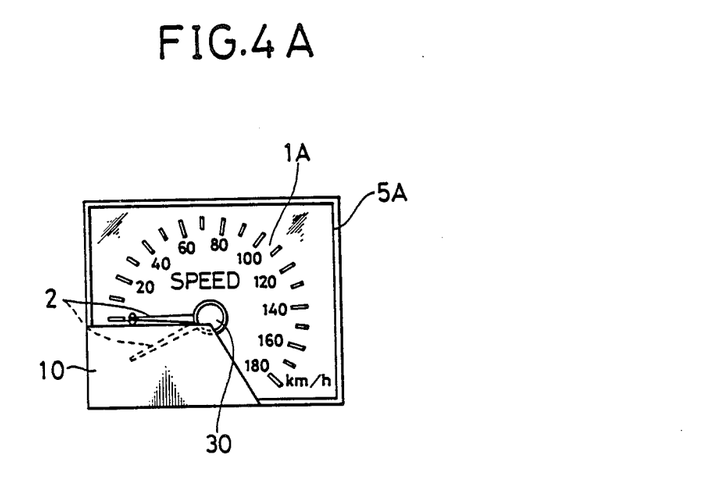
FIG. 4A is a front view showing a second embodiment of the indicating instrument of the present invention.
Figure 4B:
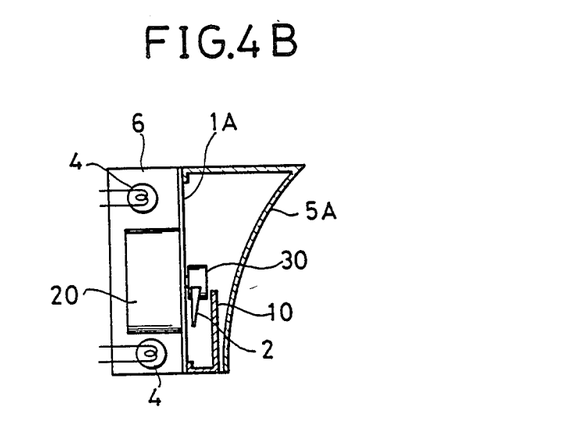
FIG. 4B is a diagrammatical cross-sectional view of FIG. 4A.

FIGS. 4A and 4B show a second embodiment of the indicating instrument of the present invention. In this embodiment, a speed meter comprises a dial 1A, a pointer 2, an internal meter 20, a pointer cover 10, and a front cover 5A. Lamps 4 for illuminating the dial 1A from the rear side thereof are disposed within the housing 6. The front cover 5A is semitransparent.

The feature of this second embodiment is to illuminate the pointer 2 made of a transparent material by light guided to the center of the pointer through an appropriate light guide member (not shown). In more detail, with reference to FIGS. 5A and 5B, the pointer 2 is made up of a pointer needle 2a, a needle center portion 2b, and a light guide portion 2c. Further, a pointer cap 30 includes a shaft portion 30b, a cap portion 30c, a channel-shaped pointer engage portion 30d and a counterweight 30e. This pointer engage portion 30d is closely engaged with the base portion of the pointer needle 2a. A pointer illumination light is guided from the lamps 4 disposed in back of the dial toward the center of the pointer 2 along two wall-shaped light guide members. In this case, in particular, it is necessary to reduce gap between the outer surface of the pointer needle 2a and the inner surface of the pointer engage portion 30d as small as possible in order to prevent light from coming out through the gap between the two. In case light comes through the above gap, this is not preferable, because light and shade portions are formed on the dial surface.

Figure 5A:
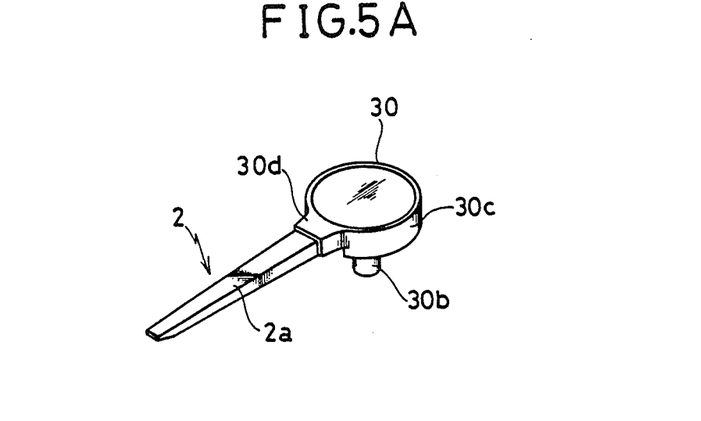
FIG. 5A is a perspective view showing a pointer and a pointer cap used for the instrument of the present invention.
Figure 5B:
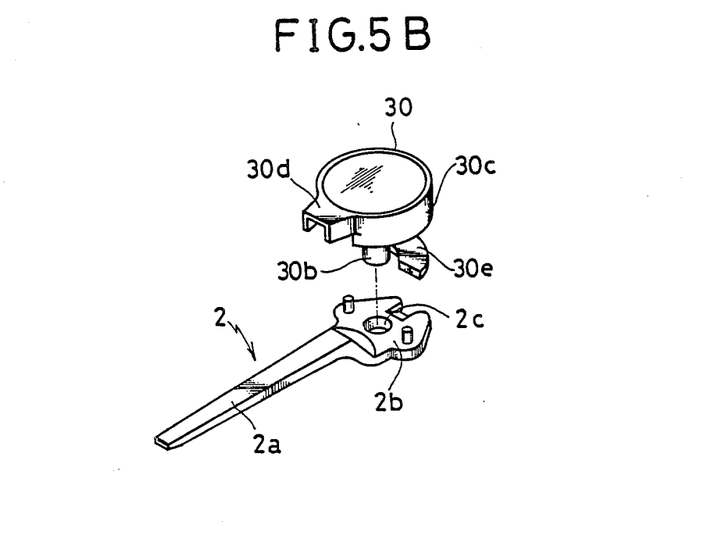
FIG. 5B is an exploded view of the pointer and the pointer cap shown in FIG. 5A.

In general, since the pointer 2 is made of a red or green transparent material, even if the pointer 2 is covered by a semitransparent cover 5A, the illuminated pointer 2 is recognizable. Further, since the pointer 2 is covered by the pointer cover 10 and the pointer cap 30, when the ignition switch is turned off, it is possible to unvisualize the indicator instrument. When the ignition switch is turned on, since the pointer 2 appears from under the pointer cover 10 and the pointer and the dial are both illuminated, the driver can see the pointer and dial through the semitransparent glass cover 5A.

Figure 6A:
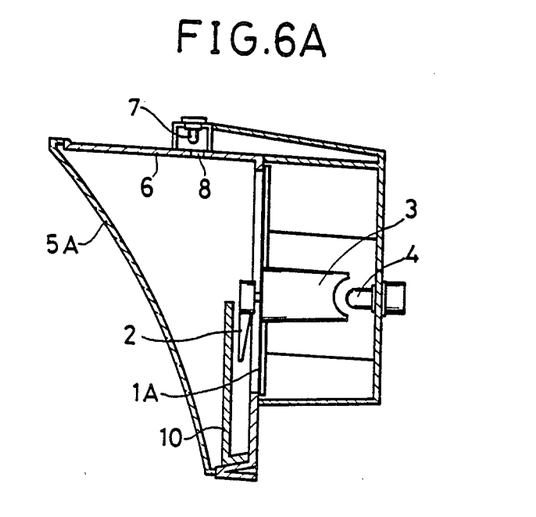
FIG. 6A is a cross-sectional view showing a third embodiment of the indicating instrument of the present invention.
Figure 6B:
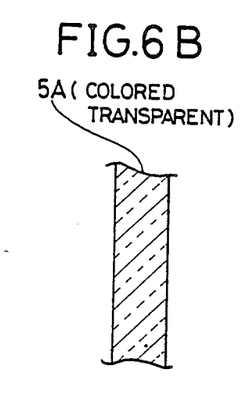
FIG. 6B is a partial enlarged cross-sectional view of the front cover of the instrument shown in FIG. 6A.
Figure 6C:
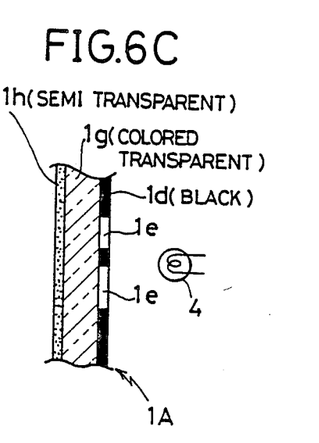
FIG. 6C is a partial enlarged cross-sectional view of the dial of the instrument shown in FIG. 6A.

FIGS. 6A, 6B and 6C show the third embodiment of the present invention. This instrument comprises a dial 1A, a pointer 2 disposed in front of the dial 1A, a light guide plate 3 disposed in back of the dial 1, a back illumination lamp 4 for illuminating both the dial 1A and the pointer 2 via the cylindrical light guide plate 3.

Being different from the prior-art one shown in FIG. 1B, the instrument further comprises a front illumination lamp 7 for illuminating the dial 1A and pointer 2 from the front side thereof through a throughhole 8 formed in the instrument housing 6. Further, the front cover 5A is made of a colored transparent material (e.g. black) as shown in FIG. 6B, and the dial 1A is formed by a multilayer including a black opaque layer 1d in which scale marks 1e such as characters, symbols, etc. are engraved, a colored transparent material 1g and a semitransparent layer 1h (e.g. clear lacquer painted), as shown in FIG. 6C.

In the above-mentioned indicating instrument, the front and back illumination lamps 7 and 4 are turned on or off in linkage with the ignition switch operation. Further, the front illumination lamp 7 is operated in linkage with the vehicle light switch. That is to say, the front and back illumination lamps 7 and 4 are turned on when the ignition switch (not shown) is turned on, and off when the ignition switch is turned off. Further, the intensity of light emitted from the front lamp 7 is decreased when the light switch (not shown) is turned on in the nighttime.

In this instrument, when the ignition switch is turned off, since the lamps 4 and 7 are kept turned off, the dial 1 and the pointer 2 are not illuminated from the back and front sides thereof. Further, the dial 1 and the pointer 2 are isolated from the external natural light by the colored (e.g. black) transparent front cover 5A. Therefore, the driver cannot substantially recognize the dial 1 and the pointer 2. This is because the display characters 1e are engraved in the black layer 1d and covered with the glass-state semitransparent layer 1h (e.g. clear lacquer painted), so that the contrast between the characters or scale marks and the black layer 1d is low.

When the ignition switch is turned on, since the back lamp 4 is lighted up, the characters, numerals, scale marks formed on the dial 1A can be recognized by light transmitted through the recesses or holes 1e, the colored transparent layer 1g and the semitransparent layer 1h. The pointer 2 is brightened by the light emitted from the lamp 4 through the cylindrical light guide 3. In addition, since the front lamp 7 is lighted up to directly illuminate the pointer 2, the pointer 2 can be recognized more clearly.

At night, the intensity of light emitted from the lamp 7 is reduced when the vehicle light switch is turned on, the displays can be recognized on the basis of light emitted from the lamp 4 through the front colored transparent cover 5A.

In the above-mentioned embodiment, since a black (colored) transparent front cover 5A is disposed in front of the pointer and the dial, the light reflected from the illuminated pointer and the dial are shut off by the front cover 5A. However, since the pointer can be seen through the colored transparent layer 1g, when the intensity of light emitted from the lamp 4 is increased, it is possible to visualize the pointer and the dial without use of a special lamp of high luminous energy. In particular, since the front lamp 7 is additionally provided, it is possible to sufficiently illuminate the pointer 2. Further, since this lamp 7 directly illuminates the dial, it is preferable to select a front lamp 7 whose quantity of light is smaller than that of the back lamp 4.

What is claimed is:

1. An indicating instrument for an automotive vehicle, comprising:
    (a) a dial for displaying pointer scale marks including:
        (1) a black opaque layer in which pointer scale marks are engraved;
        (2) a semitransparent layer; and
        (3) a colored transparent layer sandwiched between said black opaque layer and said semitransparent layer
    (b) a pointer for indicating on said dial a quantity measured;
    (c) means for driving said pointer according to a quantity measured; and
    (d) means, disposed on said dial means, for substantially covering said pointer when said means for driving said pointer is deactivated.

2. The indicating instrument of claim 1, further comprising at least one pointer illuminating lamp disposed in front of said dial and a colored transparent front cover disposed in front of said dial, for illuminating said pointer only when said pointer illuminating lamp is on.

3. The indicating instrument of claim 1, wherein said means for driving said pointer comprises:
    (a) a disk-shaped rotary permanent magnet magnetized radially having said pointer attached at the center thereof;
    (b) a first fixed coil wound around said permanent magnet in a radial direction thereof;

(c) a second fixed coil wound around said rotary permanent magnet extending across said first coil in another radial direction thereof;

(d) an offset permanent magnet disposed near said rotary permanent magnet to magnetically lock said rotary permanent magnet at a position where said pointer is substantially covered by said pointer covering means when said means for driving said pointer is deactivated.

4. The indicating instrument of claim 1, further comprising a colored transparent front cover disposed in front of said dial.

5. The indicating instrument of claim 1, further comprising at least one dial illuminating lamp, disposed behind said dial, for illuminating the pointer scale marks only when said dial illuminating lamp is on.

6. The indicating instrument of claim 1, further comprising at least one pointer illuminating lamp disposed in front of said dial means for illuminating said pointer only when said pointer illuminating lamp is on.

7. The indicating instrument of claim 1, wherein said pointer comprises:

(a) a pointer needle of colored transparent material;

(b) a pointer cap disposed at a center of said pointer needle in close engagement with said pointer needle; and (c) light guided from the center of said pointer to said pointer needle without passing through a gap between said transparent pointer needle and said pointer cap.

* * * * *